United States Patent [19]

Weiler

[11] 4,353,287
[45] Oct. 12, 1982

[54] BRAKE BOOSTER

[75] Inventor: Rolf Weiler, Frankfurt-Sindlingen, Fed. Rep. of Germany

[73] Assignee: ITT Industries, Inc., New York, N.Y.

[21] Appl. No.: 143,976

[22] Filed: Apr. 28, 1980

[30] Foreign Application Priority Data

May 10, 1979 [DE] Fed. Rep. of Germany ....... 2918910

[51] Int. Cl.³ .................... F15B 9/10; F01B 19/00; F16J 3/02
[52] U.S. Cl. .................................. 91/369 A; 92/99; 60/554
[58] Field of Search ............. 91/369 A, 369 B, 376 R; 92/166, 165 R, 165 PR, 99, 98 R, 98 D; 60/547 R, 554

[56] References Cited

U.S. PATENT DOCUMENTS 3,482,485 12/1969 Abbott ............................. 91/369 R
3,537,358 11/1970 Bunyard .............................. 92/166
4,270,353 6/1981 Thomas et al. ................ 92/165 PR

FOREIGN PATENT DOCUMENTS 2922299 12/1979 Fed. Rep. of Germany ... 91/369 A
2037918 7/1980 United Kingdom ............. 91/369 A Primary Examiner—Paul E. Maslousky
Attorney, Agent, or Firm—John T. O'Halloran; Alfred C. Hill

[57] ABSTRACT

A considerable reduction in weight of a brake booster is achieved in relation to conventional brake boosters by disposing a tube or pipe coaxially in the vacuum housing and connected to both end walls of the vacuum housing. According to the present invention the overall length of brake booster is reduced and the assembly thereof is easier. This is accomplished by constructing the force transmitting elements between the movable wall and the control housing as ring segments which are rigidly fastened to the movable wall on the vacuum chamber side thereof and engage radial indentations at the adjacent end of the control housing.

10 Claims, 3 Drawing Figures

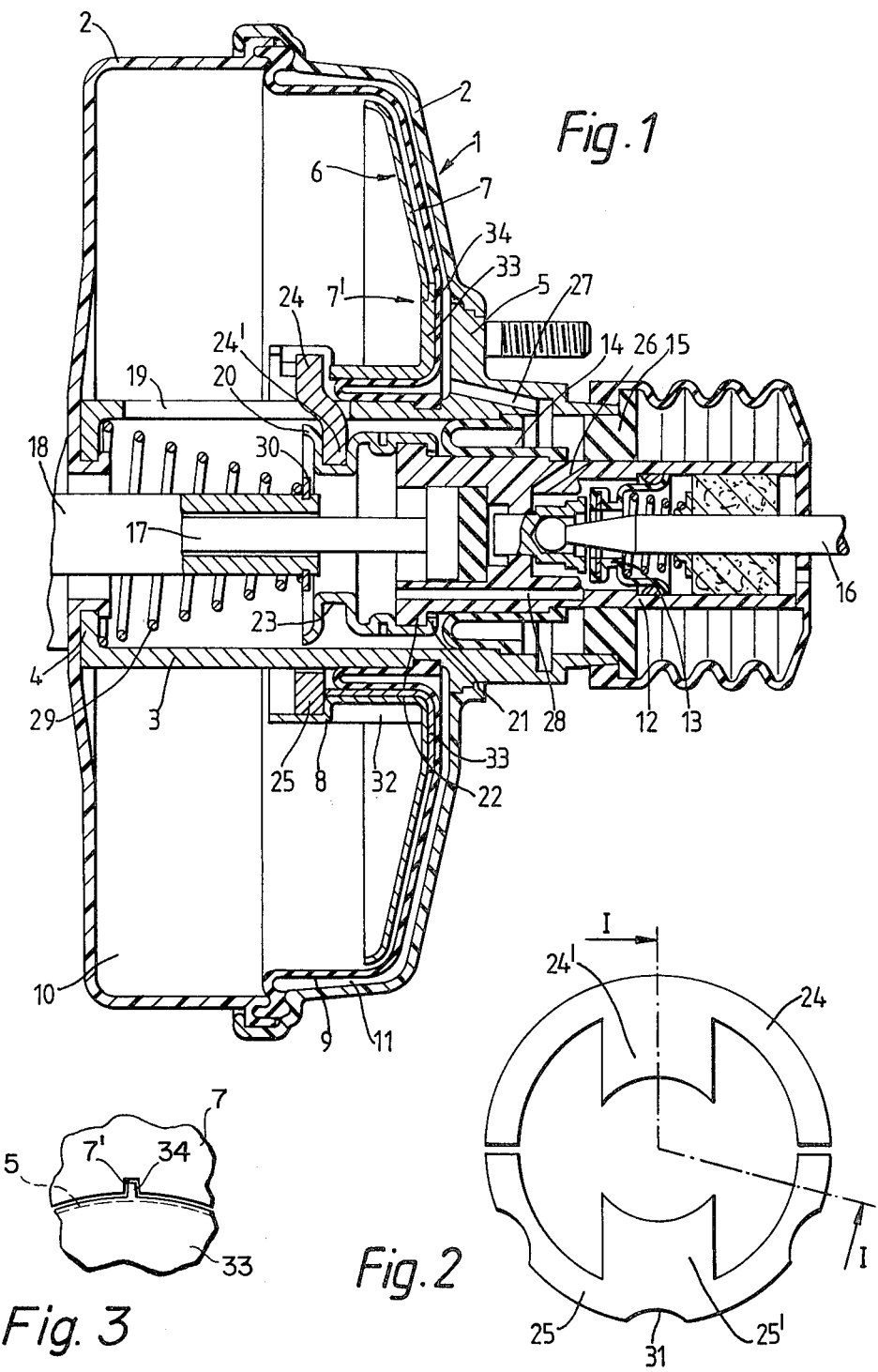

BRAKE BOOSTER

BACKGROUND OF THE INVENTION

The present invention relates to a mechanically controlled brake booster for a motor vehicle which utilizes the pressure difference between a vacuum and the atmospheric pressure and which essentially includes a vacuum housing or casing with at least one movable wall arranged therein and a pressure control valve provided with a control housing or casing. The movable wall, which is provided with a hub, divides the vacuum casing into a vacuum chamber and a working chamber and, by means of cross members acts on a push rod guided in the axial direction of the brake booster. A pipe or tube is arranged in the vacuum casing which at least approximately extends in the axial direction and is connected to the end walls of the vacuum casing. The tube is provided with at least two longitudinal slots and the movable wall is sealed and displaceable relative to the pipe.

Such a brake booster is disclosed in the copending U.S. patent application of J. Belert-F. Wienecke, Ser. No. 61,113, filed July 16, 1979, assigned to the same assignee as the present application, whose discosure is incorporated herein by reference. This application provides a brake booster in which the material costs and the weight are considerably reduced as compared with known brake boosters.

SUMMARY OF THE INVENTION

It is an object of the present invention to provide a brake device which will feature the advantageous characteristics of the brake booster of the above-cited copending patent application and which, in addition, is characterized by reduced constructional length and easier assembly.

A feature of the present invention is the provision of a mechanically controlled vacuum brake booster comprising: a vacuum housing having a longitudinal axis; a tube disposed in the vacuum housing coaxial of the axis connected to both end walls of the vacuum housing, the tube having at least two longitudinal slots therein; at least one movable wall disposed in the vacuum housing coaxial of the axis dividing the vacuum housing into a vacuum chamber and a work chamber, the movable wall having a hub disposed coaxial of the axis, the movable wall being sealed and displaceable relative to the tube; a pressure control valve having a control casing disposed in the housing coaxial of the axis and extending into the tube; and at least two semicircular segments each having at least one projection extending radially inwardly, the two semicircular segments being rigidly fastened to the hub adjacent the end thereof in the vacuum chamber and the projections extending through the slots and fastened to the adjacent end of the control casing, the two segments acting on a push rod disposed coaxial of the axis to actuate a master brake cylinder piston.

The essential advantages of the brake booster of the present application is inexpensive components easily manufactured, it will enable easy and mechanical assembly, there will be a considerable reduction of the constructional length.

Another feature of the present invention is that the component connected with the control casing is a metal sleeve with a radial groove and that a rolling diaphragm is provided as a seal between the control casing and the tube. This measure will allow the free choice of the material of the control casing while the elimination of a long guiding surface for a seal between the control casing and the tube will result in an additional reduction of the constructional length. A further advantage is in the crank-like or bent construction of the cross members.

Other features of the present invention are directed to advantageous ways of fastening the cross members and the metal sleeve.

A further feature of the present invention is that the brake booster can be assembled from the master brake cylinder side.

Still another feature of the present invention is that the diaphragm plate can be slid over the splash-wall side flange and allows the assembly from this side in case of a one piece construction of the tube and the master brake cylinder.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross sectional view of a brake booster along the line I—I in FIG. 2 in accordance with the principles of the present invention;

FIG. 2 is a front view of the cross members 24 of FIG. 1; and

FIG. 3 is a partial front view of diaphragm plate 7 and sleeve 33 of FIG. 1.

DESCRIPTION OF THE PREFERRED EMBODIMENT

Referring to FIG. 1, brake booster 1 includes a vacuum housing or casing 2 with a tube 3 arranged coaxially therein. Tube 3, on one end thereof, has a first flange 4 for fastening a master brake cylinder, or flange 4 is a part of the master brake cylinder. Adjacent the other end of tube 3 a second flange 5 is provided for fastening the brake booster to a splash wall of a motor vehicle. Fastened to flanges 4 and 5 and suitably sealed thereto, are the end walls of vacuum casing 2. A movable wall 6 which comprises a diaphragm plate 7, a hub 8, and a rolling diaphragm 9 is sealed relative to tube 3 by means of the inner edge of rolling diaphragm 9. The outer edge of rolling diaphragm 9 is clamped in the outer periphery of vacuum casing 2. Thus, movable wall 6 divides vacuum casing 2 into a vacuum chamber 10 and a working chamber 11.

Slideably arranged in tube 3 is a control housing or casing 12 of a pressure control valve 13. Control casing 12 is sealed by means of a rolling diaphragm 14 between control casing 12 and tube 3 and a seal 15 which shuts the splash-wall end of tube 3. On the side of the splash-wall, control casing 12 projects from tube 3. Control casing 12 is preferably made from duroplastic or thermoplastic material. At the splash-wall end of control casing 12 a piston rod 16, serving to actuate pressure control valve 13 extends into control casing 12. At the other end of control casing 12, a push rod 17 is held which acts on the piston 18 of a master brake cylinder.

Tube 3 has longitudinal slots 19 disposed between rolling diaphragm 14 and flange 4 to enable hub 8 to be connected to control casing 12. Basically this connection is provided by two cross members 24 and 25 being fastened to hub 8 in vacuum chamber 10, extending through slots 19 and then coupled to the adjacent end of control casing 12 thereby enabling actuation of push rod 17 via control casing 12. In a preferred construction, the coupling between control casing 12 and cross members 24 and 25 is provided by a metal sleeve 20. Metal sleeve 20 is fixed to control casing 12 adjacent to adjacent ends of push rods 16 and 17 by a collar of metal sleeve 20 which reaches beyond a radial projection 22 of control casing 12 and is fastened on the other side of radial projection 22 by being deformed. Metal sleeve 20 has a radial groove 23 disposed adjacent an end thereof adjacent the master brake cylinder.

The end of hub 8 in vacuum chamber 10 has an enlarged diameter portion providing a step in hub 8 against which cross members 24 and 25 are fastened. Cross members 24 and 25 are semicircular rings or segments having inwardly extending projections 24' and 25'. The outer area of members 24 and 25 are fastened to the steps of hub 8 in vacuum chamber 10 and projections 24' and 25' extend through slots 19 of tube 3 and engage radial groove 23 of sleeve 20. To assist in reducing the overall length of the booster, the length of sleeve 20 is selected to position groove 23 closer to the splash-wall end of tube 3 than is the step of hub 8 in vacuum chamber 10 and projections 24' and 25' are bent toward the splash-wall end of tube 3 to engage tube groove 23. The resultant cross section of members 24 and 25 is crank-like in appearance.

Between the splash-wall end of tube 3, seal 15, rolling diaphragm 14, and control casing 12, a cavity is formed in which a first channel 26 and a second channel 27 end, the first channel 26 leading to valve 13 and the second channel 27 leading to working chamber 11. Valve 13 is connected with vacuum chamber 10 via a third channel 28, the interior space of tube 3, and slots 19. Inside tube 3, a spring 29 is disposed which, on the one hand, is supported by flange 4 and, on the other hand, by a ring 30 fastened to master brake cylinder piston 18. Spring 29 serves to return master brake cylinder piston 18 and movable wall 6 to their rest position after actuation of the brake booster.

Recesses 7' are provided in diaphragm plate 7 which are larger than flange 5 and which cooperate with projections 34 of a sleeve 33 which is also provided with recesses larger than flange 5.

In FIG. 2 a front view of cross members 24 and 25 is illustrated. The upper and the lower semicircular segment each show a different embodiment. Line I—I shows the course of the sectional line along which the brake booster of FIG. 1 is illustrated. The cross members 24 and 25 are semicircular segments, each having a projection 24' and 25' pointing radially inwards.

In one embodiment both cross members 24 and 25 have a smooth edge as illustrated by member 24 and in the other embodiment both cross members 24 and 25 have recesses 31 at their outer edge as illustrated by member 25. Hub 8 may be provided with projections 32 matching these recesses and pointing radially inwards. Such a construction makes it possible, during assembly, to slip diaphragm plate 7 with projections 32 of hub 8 over cross members 24 and 25 whereupon, thanks to a twist, cross members 24 and 25 may be locked in hub 8 in a bayonet-type manner. This provides an advantageous arrangement for assembly from the master brake cylinder side.

Thanks to recesses 7' and sleeve 33, a particularly advantageous means is provided to assemble wall 6 from the splash-wall end of tube 3 which may prove necessary in devices which feature a one-piece design of tube 3 and the master brake cylinder. The assembly will be performed as follows.

Diaphragm plate 7 will be slipped with recesses 7' over flange 5. Sleeve 33 having projections 34, already disposed coaxial of tube 3 will then be placed in position as shown in FIG. 3. A subsequent twisting of sleeve 33 relative to diaphragm plate 7 will bring sleeve 33 into a position in which projections 34 will engage behind diaphragm plate 7 adjacent working chamber 11 as shown in FIG. 1.

While I have described above the principles of my invention in connection with specific apparatus it is to be clearly understood that this description is made only by way of example and not as a limitation to the scope of my invention as set forth in the objects thereof and in the accompanying claims.

I claim:
1. A mechanically controlled vacuum brake booster comprising:
   a vacuum housing having a longitudinal axis;
   a tube disposed in said vacuum housing coaxial of said axis connected to both end walls of said vacuum housing, said tube having at least two longitudinal slots therein;
   at least one movable wall disposed in said vacuum housing coaxial of said axis dividing said vacuum housing into a vacuum chamber and a work chamber, said movable wall having a hub disposed coaxial of said axis, said movable wall being sealed and displaceable relative to said tube;
   a pressure control valve having a control casing disposed in said housing coaxial of said axis and extending into said tube; and
   at least two semicircular segments each having at least one projection extending radially inwardly, said two semicircular segments being rigidly fastened to said hub adjacent the end thereof in said vacuum chamber and said projections extending through said slots and coupled to the adjacent end of said control casing by a coupling means, said two projections acting via said control casing on a push rod disposed coaxial of said axis to actuate a master brake cylinder piston.

2. A booster according to claim 1, wherein said projections engage a radial groove formed in one end of a metal sleeve disposed coaxial of said axis, the other end of said sleeve providing said coupling means being connected to said control casing.

3. A booster according to claim 2, wherein a rolling diaphragm is disposed between said tube and said control casing to provide a seal therebetween.

4. A booster according to claim 2, wherein:
   each of said two semicircular segments have a crank-like cross section.

5. A booster according to claim 2, wherein said sleeve projects over and engages radial projection on the outer surface of said control casing.

6. A booster according to claim 1, wherein a rolling diaphragm is disposed between said tube and said control casing to provide a seal therebetween.

7. A booster according to claim 1, wherein:
   each of said two semicircular segments have a crank-like cross section.

8. A booster according to claim 1, wherein:
   each of said two semicircular segments are provided with recesses on the outer edge thereof, and said hub includes thereon projections matching said recesses.

9. A booster according to claim 1, wherein:
said movable wall includes a diaphragm plate and a rolling diaphragm to provide a seal between said working chamber and said vacuum chamber, said diaphragm plate includes recesses therein which are larger than a mounting flange provided on the end of said tube adjacent said working chamber.

10. A booster according to claim 9, further including:
a sleeve coaxial of said tube having projections engaging a surface of said diaphragm plate adjacent said working chamber.

* * * * *